(12) United States Patent
Maheshwari et al.

(10) Patent No.: US 8,948,393 B2
(45) Date of Patent: Feb. 3, 2015

(54) UNINTERRUPTED TRANSMISSION DURING A CHANGE IN CIPHERING CONFIGURATION

(75) Inventors: Shailesh Maheshwari, San Diego, CA (US); Kiran Chikkappa, San Diego, CA (US); Vivek Ramachandran, Carlsbad, CA (US)

(73) Assignee: QUALCOMM Incorporated, San Diego, CA (US)

(*) Notice: Subject to any disclaimer, the term of this patent is extended or adjusted under 35 U.S.C. 154(b) by 1117 days.

(21) Appl. No.: 11/693,619

(22) Filed: Mar. 29, 2007

(65) Prior Publication Data
US 2007/0263871 A1 Nov. 15, 2007

Related U.S. Application Data

(60) Provisional application No. 60/795,775, filed on Apr. 28, 2006.

(51) Int. Cl.
| | |
|---|---|
| *H04K 1/00* | (2006.01) |
| *H04L 29/06* | (2006.01) |
| *H04W 12/02* | (2009.01) |
| *H04W 84/04* | (2009.01) |

(52) U.S. Cl.
CPC .......... *H04L 63/0428* (2013.01); *H04L 63/162* (2013.01); *H04L 63/068* (2013.01); *H04L 63/20* (2013.01); *H04W 12/02* (2013.01); *H04W 84/042* (2013.01)
USPC .............................. 380/273; 380/274; 713/151

(58) Field of Classification Search
CPC ............... H04L 9/12; H04L 9/18; H04L 9/08; H04L 9/00; H04L 9/0891; H04L 9/083; H04L 2209/80; H04L 63/162; H04L 63/068; H04K 1/00; H04K 1/04; H04W 12/02; G07C 9/00182
See application file for complete search history.

(56) References Cited

U.S. PATENT DOCUMENTS

| | | | |
|---|---|---|---|
| 6,870,932 B2 | 3/2005 | Jiang | |
| 2002/0164029 A1* | 11/2002 | Jiang | 380/270 |

(Continued)

FOREIGN PATENT DOCUMENTS

| | | |
|---|---|---|
| JP | 63107354 A | 5/1988 |
| JP | 2003078581 A | 3/2003 |

(Continued)

OTHER PUBLICATIONS

International Search Report—PCT/US07/067722, International Search Authority—European Patent Office—Nov. 13, 2007.

(Continued)

*Primary Examiner* — Kambiz Zand
*Assistant Examiner* — Trong Nguyen
(74) *Attorney, Agent, or Firm* — Kevin T. Cheatham

(57) ABSTRACT

Techniques for sending information without interruption during a change in ciphering configuration are described. A user equipment (UE) communicates with a wireless communication network for a call. The UE sends first information to the wireless network using a first ciphering configuration. For a change in ciphering configuration, the UE selects an activation time for a second ciphering configuration and sends a security message with the activation time. This activation time is the time at which the UE applies the second ciphering configuration to transmission sent to the wireless network. The UE thereafter sends second information (e.g., a measurement report message) using the first ciphering configuration after sending the security message and before the activation time. The UE sends third information using the second ciphering configuration after the activation time.

22 Claims, 7 Drawing Sheets

(56) References Cited

U.S. PATENT DOCUMENTS

| | | | |
|---|---|---|---|
| 2003/0035545 A1* | 2/2003 | Jiang | 380/272 |
| 2003/0100291 A1* | 5/2003 | Krishnarajah et al. | 455/410 |
| 2005/0086466 A1* | 4/2005 | Funnell et al. | 713/150 |

FOREIGN PATENT DOCUMENTS

| | | |
|---|---|---|
| JP | 2005236490 A | 9/2005 |
| JP | 2007181074 A | 7/2007 |
| RU | 2251797 | 5/2005 |
| WO | 2005112336 A1 | 11/2005 |

OTHER PUBLICATIONS

Universal Mobile Telecommunications System (UMTS); Radio Resource Control (RRC) protocol specification (3GPP TS 25.331 version 6.9.0 Release 6); ETSI TS 125 331 ETSI Standards, European Telecommunications Standards Institute, Sophia-Antipo, FR, vol. 3-R2, No. V690, Mar. 2006, XP014034301.

3GPP TS 25.331; V7.1.0 Section 8.1.12, pp. 99 to 106 (Jun. 2006).

"3rd Generation Partnership Project; Technical Specification Group Radio Access Network; RRC Protocol Specification (Release 1999)", 3GPP TS 25.331 Technical Specification, [online], Sep. 2001, v3.8.0, pp. 95-103 and 225-227, [retrieved on Jul. 12, 2011], Retrieved from the Internet, URL, <http://www.quintillion. co.,jp/3GPP/JPR99/25331-380j.pdf>.

Written Opinion—PCT/US07/067722, International Search Authority, European Patent Office, Nov. 13, 2007.

European Search Report—EP13020102—Search Authority—Munich—Nov. 26, 2013.

* cited by examiner

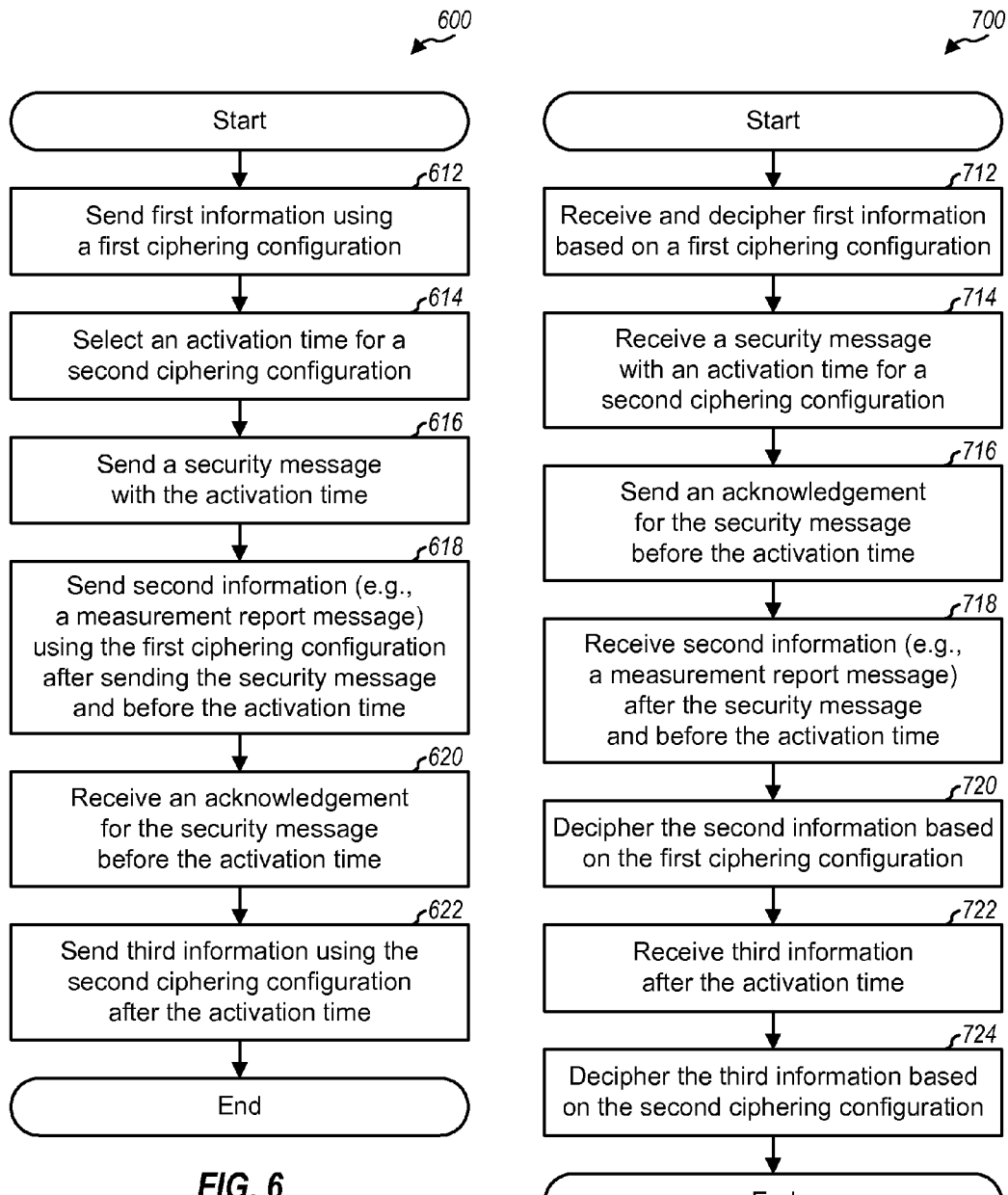

UNINTERRUPTED TRANSMISSION DURING A CHANGE IN CIPHERING CONFIGURATION

The present application claims priority to provisional U.S. Application Ser. No. 60/795,775, entitled "Performance Improvement to reduce call drops in bad radio conditions during security reconfiguration," filed Apr. 28, 2006, assigned to the assignee hereof and incorporated herein by reference.

BACKGROUND

I. Field

The present disclosure relates generally to communication, and more specifically to techniques for sending information during a change in ciphering configuration.

II. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, etc.

A wireless network may use ciphering to protect information sent over the air. The terms "ciphering" and "encryption" are synonymous and are used interchangeably. At the start of a call, information may be sent in the clear until a ciphering configuration is set up. The ciphering configuration may indicate a particular algorithm and/or pertinent parameters (e.g., security keys) to use for ciphering. After setting up the ciphering configuration, a message may be sent to indicate that ciphering will start at a designated activation time. Information may be sent with ciphering after the activation time.

The ciphering configuration may be changed during the call. After completing the change, a message may be sent to indicate that ciphering with the new configuration will start at a designated activation time. Information may be sent using the old ciphering configuration prior to this activation time and using the new ciphering configuration after the activation time.

To ensure that no information is lost due to a change in ciphering configuration, transmission may be suspended from the time a message regarding the new ciphering configuration is sent to the time an acknowledgement is received for the message. This ensures that a receiver entity is aware of the upcoming transmission with the new ciphering configuration. However, a certain delay is associated with sending the acknowledgement, and suspending transmission during this time may adversely impact performance. For example, if time critical information cannot be sent during the suspension period, then the call may be dropped or other deleterious effects may occur.

There is therefore a need in the art for techniques to send information during a change in ciphering configuration.

SUMMARY

Techniques for sending information without interruption during a change in ciphering configuration are described herein. A user equipment (UE) communicates with a wireless communication network for a call. The UE may be a cellular phone or some other device. The wireless network may be a Universal Mobile Telecommunications System (UMTS) network or some other wireless network.

The UE sends first information to the wireless network using a first ciphering configuration. A security mode control procedure may be initiated by the wireless network to change ciphering configuration. As part of this procedure, the UE selects an activation time for a second ciphering configuration and sends a security message with the activation time. This activation time is the time at which the UE applies the second ciphering configuration to transmission sent to the wireless network. The UE thereafter sends second information (e.g., a measurement report message) using the first ciphering configuration after sending the security message and before the activation time. The UE may receive an acknowledgement from the wireless network for the security message prior to the activation time. The UE sends third information using the second ciphering configuration after the activation time. The first, second and third information may comprise signaling messages, data, etc.

The UE may select the activation time based on (a) any pending messages to send using the first ciphering configuration prior to sending the security message, (b) the length of the security message, and (c) one or more messages to send using the first ciphering configuration after sending the security message. The first, second, and third information and the security message may be sent in protocol data units (PDUs) that are assigned sequential sequence numbers. The UE may select an activation sequence number based on the sequence number of the next PDU to send, the number of PDUs to send before the security message, the number of PDUs to send for the security message, and the number of PDUs to send using the first ciphering configuration after sending the security message. To ensure that the second ciphering configuration is used only after the wireless network has successfully received the security message, the UE may suspend transmission of PDUs with sequence numbers greater than or equal to the activation sequence number until an acknowledgement is received from the wireless network for the security message.

The wireless network may also apply the techniques in an analogous manner for transmission on the downlink. This allows the wireless network to avoid suspension of downlink transmission during a change in ciphering configuration. Various aspects and features of the disclosure are described in further detail below.

BRIEF DESCRIPTION OF THE DRAWINGS

FIG. 6 shows a process performed by a transmitter entity.

FIG. 7 shows a process performed by a receiver entity.

DETAILED DESCRIPTION

The techniques described herein may be used for various wireless communication networks. The terms "network" and "system" are often used interchangeably. For example, the techniques may be used for CDMA, TDMA, FDMA, and OFDMA networks. A CDMA network may implement a radio technology such as Wideband-CDMA (W-CDMA), cdma2000, etc. cdma2000 covers IS-2000, IS-95, and IS-856 standards. A TDMA network may implement a radio technology such as Global System for Mobile Communications (GSM), Digital Advanced Mobile Phone System (D-AMPS), etc. These various radio technologies and standards are known in the art. W-CDMA and GSM are described in documents from an organization named "3rd Generation Partnership Project" (3GPP). cdma2000 is described in documents from an organization named "3rd Generation Partnership Project 2" (3GPP2). 3GPP and 3GPP2 documents are publicly available. For clarity, certain aspects of the techniques are described for a UMTS network that implements W-CDMA.

Figure 1:
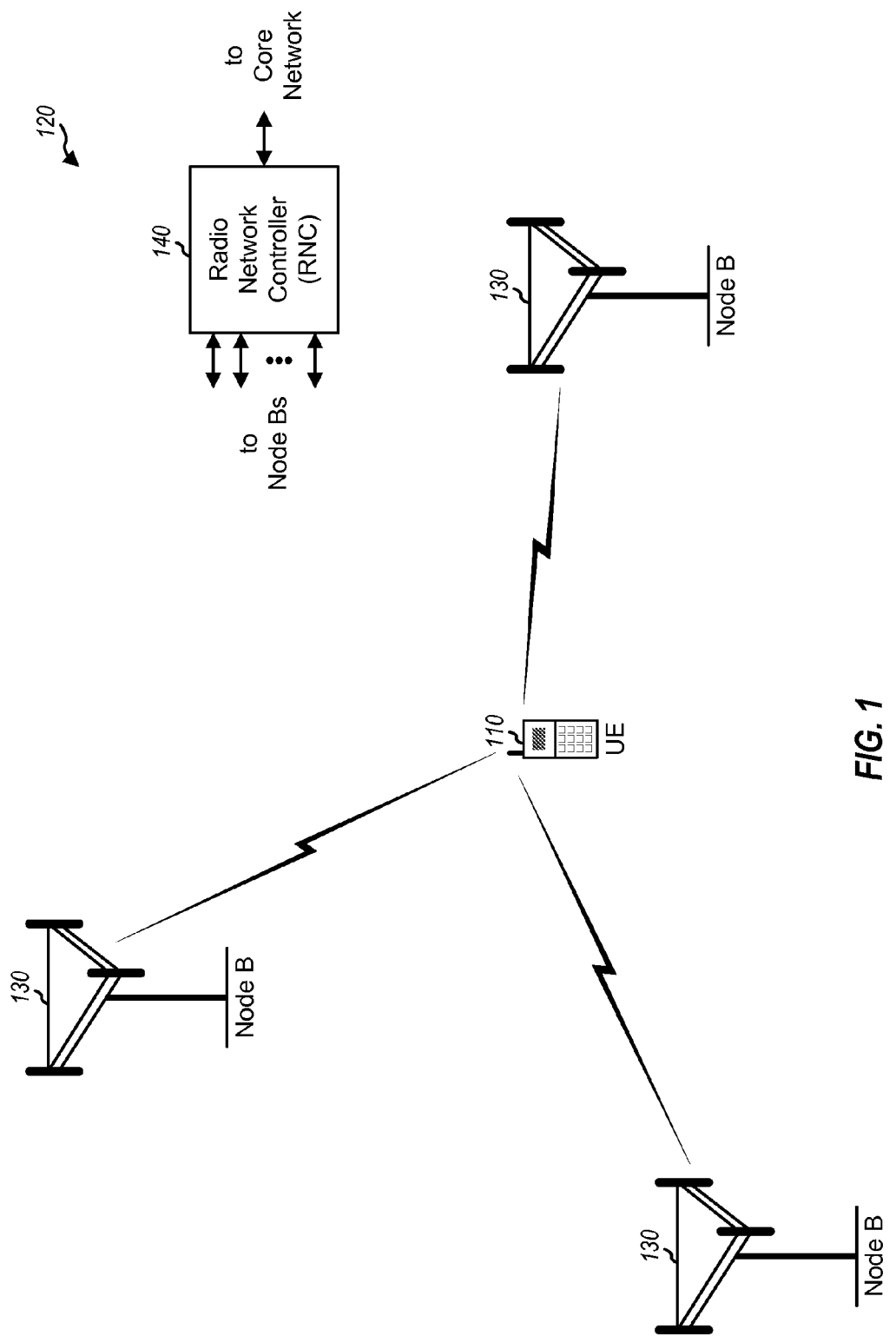
FIG. 1 shows a UE communicating with a UMTS Terrestrial Radio Access Network (UTRAN).

FIG. 1 shows a UE 110 communicating with a UTRAN 120 in 3GPP. UTRAN 120 includes a number of Node Bs that support radio communication for a number of UEs. For simplicity, only three Node Bs 130 and one UE 110 are shown in FIG. 1. A Node B is generally a fixed station that communicates with the UEs and may also be referred to as an enhanced Node B, a base station, an access point, a base transceiver station (BTS), etc. Each Node B provides communication coverage for a particular geographic area. A Node B and/or its coverage area may be referred to as a "cell", depending on the context in which the term is used. A Radio Network Controller (RNC) 140 couples to Node Bs 130 and provides coordination and control for these Node Bs.

UE 110 may be stationary or mobile and may also be referred to as a mobile station, an access terminal, a station, a subscriber station, etc. UE 110 may be a cellular phone, a personal digital assistant (PDA), a wireless device, a modem card, a handheld device, a laptop computer, etc. UE 110 may communicate with one or more Node Bs on the downlink and/or uplink at any given moment. The downlink (or forward link) refers to the communication link from the Node Bs to the UE, and the uplink (or reverse link) refers to the communication link from the UE to the Node Bs.

UE 110 may communicate with UTRAN 120 using a protocol stack that includes a Radio Resource Control (RRC) layer, a Radio Link Control (RLC) layer, a Medium Access Control (MAC) layer, and a physical layer. The RRC layer is part of Layer 3. The RLC and MAC layers are parts of Layer 2, which is commonly referred to as a data link layer. The RRC layer provides information transfer service to a Non Access Stratum (NAS), which is a functional layer that supports traffic and signaling messages between UE 110 and a core network with which UTRAN 120 interfaces. The RRC layer is also responsible for controlling the configuration of Layers 1 and 2. The RLC layer provides reliability for transmission of information (e.g., data and/or signaling) and performs automatic retransmission (ARQ) of information decoded in error. The MAC layer performs functions such as encoding of information. The physical layer provides a mechanism for transmitting information over the air. On the UTRAN side, the physical layer is typically implemented at Node Bs 130, and the RLC, MAC, and RRC layers are typically implemented at RNC 140.

UE 110 may communicate with UTRAN 120 via one or more radio bearers at Layer 2. A radio bearer is a service provided by Layer 2 for the transfer of information between the UE and UTRAN. A signaling radio bearer (SRB) is a radio bearer used for sending RRC messages. SRB2 is a signaling radio bearer that is used for most of the RRC messages. Each radio bearer is associated with a specific configuration for logical channels at the RLC layer, transport channels at the MAC layer, and physical channels at the physical layer. The radio bearers and signaling radio bearers are described in 3GPP TS 25.331, entitled "Radio Resource Control (RRC); Protocol Specification," June 2006, which is publicly available.

UE 110 and UTRAN 120 may communicate with ciphering to protect information sent over the air. A security mode control procedure may be performed by UE 110 and UTRAN 120 to set up a ciphering configuration, which may indicate a specific ciphering algorithm and/or specific parameters to use for ciphering. Ciphering may then be performed on information sent on radio bearers and signaling radio bearers in accordance with the ciphering configuration. A security mode control procedure may also be performed to change ciphering configuration. Ciphering may then be performed in accordance with the new ciphering configuration.

Figure 2:
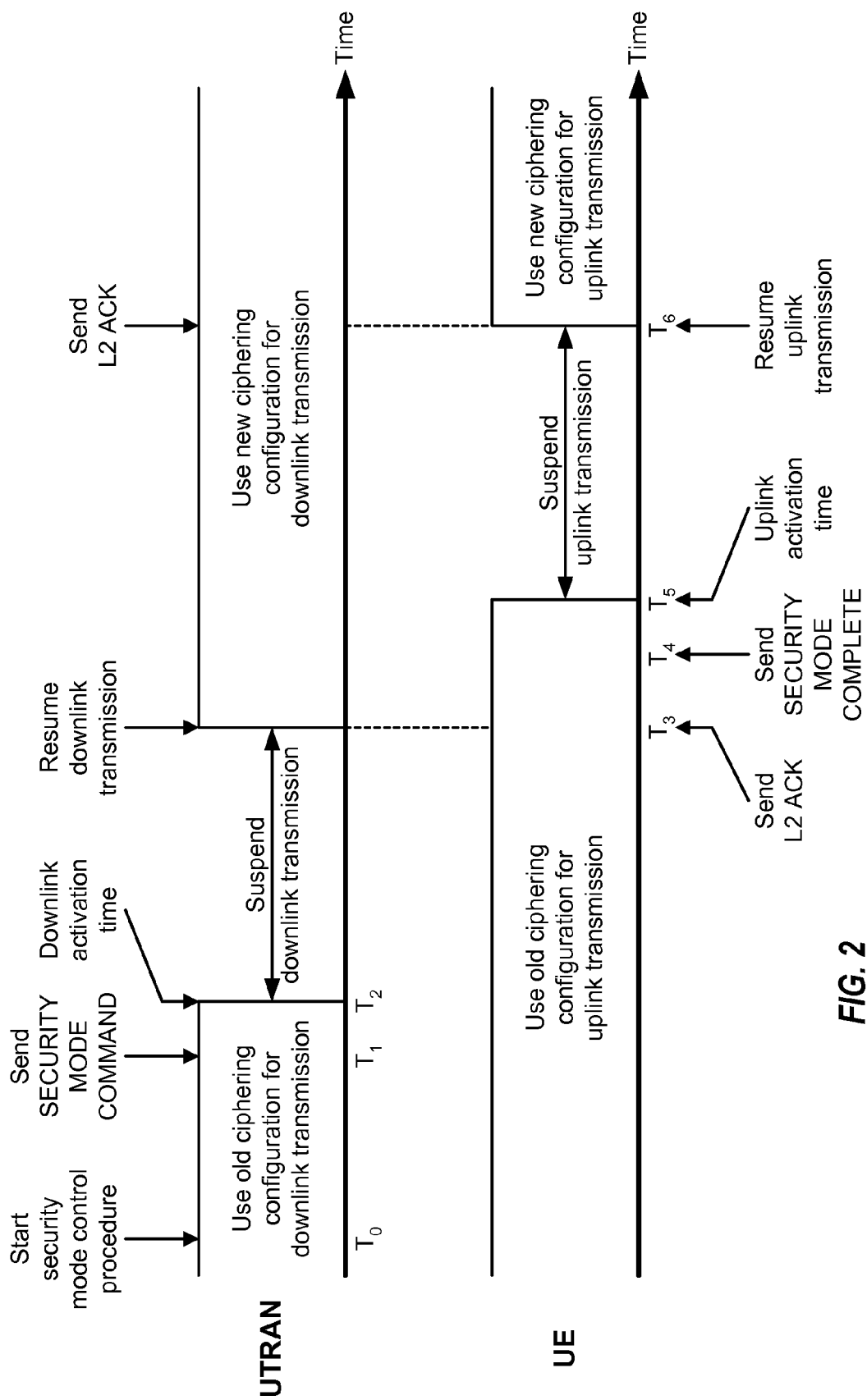
FIG. 2 shows signaling exchanged between the UE and UTRAN to change ciphering configuration.

FIG. 2 shows timelines at UE 110 and UTRAN 120 for signaling exchanged between the UE and UTRAN to change ciphering configuration. At the start of a call, a ciphering configuration is set up, and both UE 110 and UTRAN 120 send information using this ciphering configuration. At time $T_0$, UE 110 and UTRAN 120 engage in a security mode control procedure to change the ciphering configuration. To start ciphering with the new ciphering configuration, UTRAN 120 sends a SECURITY MODE COMMAND message on the downlink starting at time $T_1$ and completing at time $T_2$. This message is sent in an RLC acknowledged mode (RLC-AM) using the old ciphering configuration. UE 110 receives and correctly decodes the SECURITY MODE COMMAND message and, at time $T_3$, sends a Layer 2 acknowledgment (L2 ACK) to indicate successful reception of the message. UE 110 also sends a SECURITY MODE COMPLETE message on the uplink in RLC-AM using the old ciphering configuration starting at time $T_4$ and completing at time $T_5$. UTRAN 120 receives and correctly decodes the message and sends an L2 ACK for this message at time $T_6$.

FIG. 2 also shows when the old and new ciphering configurations are applied for downlink and uplink transmissions. For the downlink, the SECURITY MODE COMMAND message sent by UTRAN 120 carries an information element (IE) containing a downlink ciphering activation time. This downlink activation time is the time at which UTRAN 120 applies the new ciphering configuration to downlink transmission. The downlink activation time may be set to the end of the SECURITY MODE COMMAND message, as shown in FIG. 2, so that the new ciphering configuration is applied to the next message sent on the downlink. UTRAN 120 uses the old ciphering configuration for downlink transmission up to the downlink activation time and uses the new ciphering configuration after the downlink activation time. UTRAN 120 may suspend downlink transmission after sending the SECURITY MODE COMMAND message and may resume downlink transmission after receiving the L2 ACK for this message from UE 110, as shown in FIG. 2.

For the uplink, the SECURITY MODE COMPLETE message sent by UE 110 carries an information element containing an uplink ciphering activation time. This uplink activation time is the time at which the new ciphering configuration is applied to uplink transmission. The uplink activation time may be set to the end of the SECURITY MODE COMPLETE message, as shown in FIG. 2, so that the new ciphering configuration is applied to the next message sent on the uplink. UE 110 uses the old ciphering configuration for uplink transmission up to the uplink activation time and uses the new ciphering configuration after the uplink activation time. UE 110 may suspend uplink transmission after sending the SECURITY MODE COMPLETE message and may resume uplink transmission after receiving the L2 ACK for this message from UTRAN 120, as shown in FIG. 2.

During the call, UE 110 may periodically search for neighbor cells and make measurements for cells detected by UE 110. UE 110 may send measurement reports to UTRAN 120 when triggered by certain events. For example, the triggering events may correspond to weak measurements for the cell currently serving UE 110, strong measurements for neighbor cells, etc. UTRAN 120 may use the measurement reports to maintain an active set for UE 110, to select a suitable cell to serve UE 110, to initiate handover of UE 110 to a better cell in order to maintain the call for UE 110, etc. The active set may include the cell designated to serve UE 110 (the serving cell) and cells that might be able to serve UE 110 (candidate cells). UTRAN 120 may send an active set update message to UE 110. This message may add radio links for strong new cells and/or remove radio links for weak old cells.

As shown in FIG. 2, UE 110 may suspend uplink transmission and UTRAN may suspend downlink transmission when changing ciphering configuration. The suspension of uplink transmission may cause UE 110 to delay sending measurement reports to UTRAN 120. These measurement reports may be used for active set maintenance and may be especially important to sustain the call under bad radio conditions. The delay in sending the measurement reports due to suspension of uplink transmission may result in the active set containing weak cells, which may in turn cause the call to be dropped. Correspondingly, the suspension of downlink transmission may cause UTRAN 120 to delay sending the active set update message to UE 110, which may also result in the call being dropped.

A reason for suspending uplink transmission during a change in ciphering configuration is to ensure that UE 110 does not send a message using the new ciphering configuration until UTRAN 120 is aware of the new ciphering configuration being applied. For the implementation shown in FIG. 2, if UTRAN 120 decodes the SECURITY MODE COMPLETE message in error and does not send an L2 ACK, then UE 110 would not send messages using the new ciphering configuration since UTRAN 120 would not know when UE 110 started using the new ciphering configuration. The suspension of uplink transmission thus ensures that UTRAN 120 can decipher all messages sent by UE 110 on the uplink.

In an aspect, UE 110 may send messages (e.g., measurement report messages) on the uplink during a change in ciphering configuration in a manner such that UTRAN 120 can decipher the messages. This may be achieved by selecting an appropriate uplink activation time for the new ciphering configuration, as described below. Similarly, UTRAN 120 may send messages (e.g., active set update messages) on the downlink during a change in ciphering configuration in a manner such that UE 110 can decipher the messages. This may be achieved by selecting an appropriate downlink activation time for the new ciphering configuration.

Figure 3:
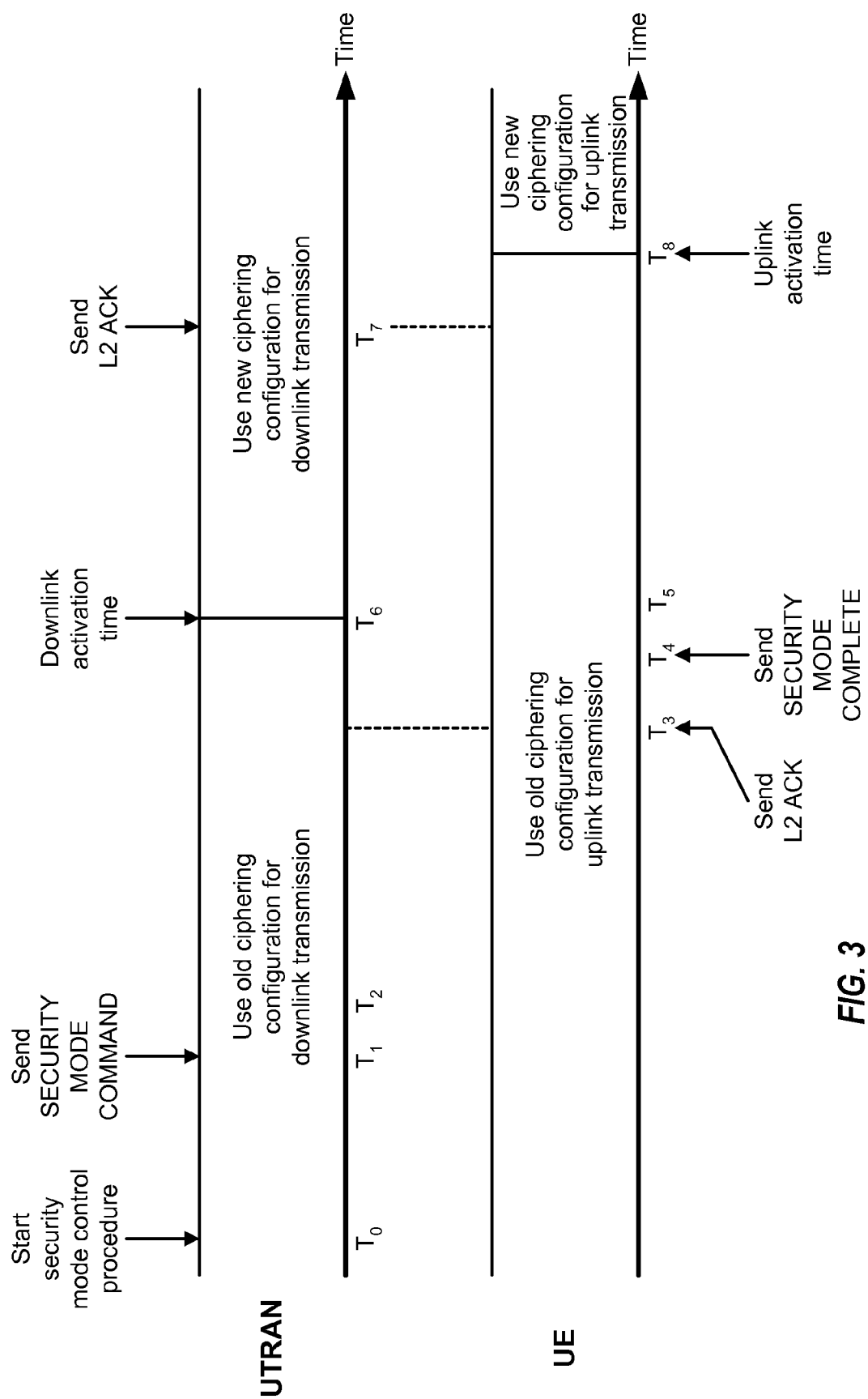
FIG. 3 shows signaling exchanged between the UE and UTRAN to change ciphering configuration without suspension of downlink and uplink transmissions.

FIG. 3 shows timelines at UE 110 and UTRAN 120 for signaling exchanged between the UE and UTRAN to change ciphering configuration without suspension of downlink and uplink transmissions. At the start of a call, a ciphering configuration is set up, and both UE 110 and UTRAN 120 send information using this ciphering configuration. At time $T_0$, UE 110 and UTRAN 120 engage in a security mode control procedure to change the ciphering configuration. To start ciphering with the new ciphering configuration, UTRAN 120 sends a SECURITY MODE COMMAND message on the downlink starting at time $T_1$ and completing at time $T_2$. UE 110 receives and correctly decodes the message and sends an L2 ACK at time $T_3$. UE 110 also sends a SECURITY MODE COMPLETE message on the uplink using the old ciphering configuration starting at time $T_4$ and completing at time $T_5$. UTRAN 120 receives and correctly decodes the message and sends an L2 ACK at time $T_7$.

FIG. 3 also shows when the old and new ciphering configurations are applied for downlink and uplink transmissions. For the downlink, UTRAN 120 selects a downlink activation time of $T_6$, which is some amount of time later than the end of the SECURITY MODE COMMAND message at time $T_2$. The difference between $T_6$ and $T_2$ is the delay in applying the new ciphering configuration on the downlink. UTRAN 120 uses the old ciphering configuration for downlink transmission up to the downlink activation time at $T_6$ and uses the new ciphering configuration after the downlink activation time. If UTRAN 120 receives the L2 ACK prior to the downlink activation time, as shown in FIG. 2, then UTRAN 120 does not suspend downlink transmission. UTRAN 120 continues to use the old ciphering configuration after receiving the L2 ACK and starts using the new ciphering configuration after the downlink activation time.

For the uplink, UE 110 selects an uplink activation time of $T_8$, which is some amount of time later than the end of the SECURITY MODE COMPLETE message at time $T_5$. The difference between $T_8$ and $T_5$ is the delay in applying the new ciphering configuration on the uplink. UE 110 uses the old ciphering configuration for uplink transmission up to the uplink activation time at $T_8$ and uses the new ciphering configuration after the uplink activation time. If UE 110 receives the L2 ACK prior to the uplink activation time, as shown in FIG. 2, then UE 110 does not suspend uplink transmission. UE 110 continues to use the old ciphering configuration after receiving the L2 ACK and starts using the new ciphering configuration after the uplink activation time.

As shown in FIG. 3, UE 110 does not suspend uplink transmission or delays suspension of uplink transmission when changing ciphering configuration if the uplink activation time is after the L2 ACK from UTRAN 120. Similarly, UTRAN does not suspend downlink transmission or delays suspension of downlink transmission when changing ciphering configuration if the downlink activation time is after the L2 ACK from UE 110. The uplink and downlink activation times may be selected based on various factors such as the expected delay in receiving the L2 ACK, the amount of information to send before switching to the new ciphering configuration, the current radio conditions, etc. By avoiding or delaying suspension of uplink transmission, measurement report messages may be sent in a timely manner by UE 110 to ensure proper active set maintenance by UTRAN 120, which may reduce the likelihood of a dropped call. By avoiding or delaying suspension of downlink transmission, active set update messages may be sent in a timely manner by UTRAN 120, which may also reduce the likelihood of a dropped call.

In general, the activation time for a given link may be given in various manners. At the RLC layer, information is sent in RLC PDUs that are assigned sequentially increasing sequence numbers (SN) from 0 to 4095, than back to 0 and continuing. In RLC-AM, which is used for messages send on SRB2, RLC PDUs that are received in error by a receiver entity are resent by a transmitter entity. The receiver entity may thus obtain correctly decoded RLC PDUs out of sequence and may use the sequence number of each RLC PDU to reorder the RLC PDUs and provide these RLC PDUs in the proper order to a higher layer. The activation time may be given in terms of RLC sequence number.

Figure 4:
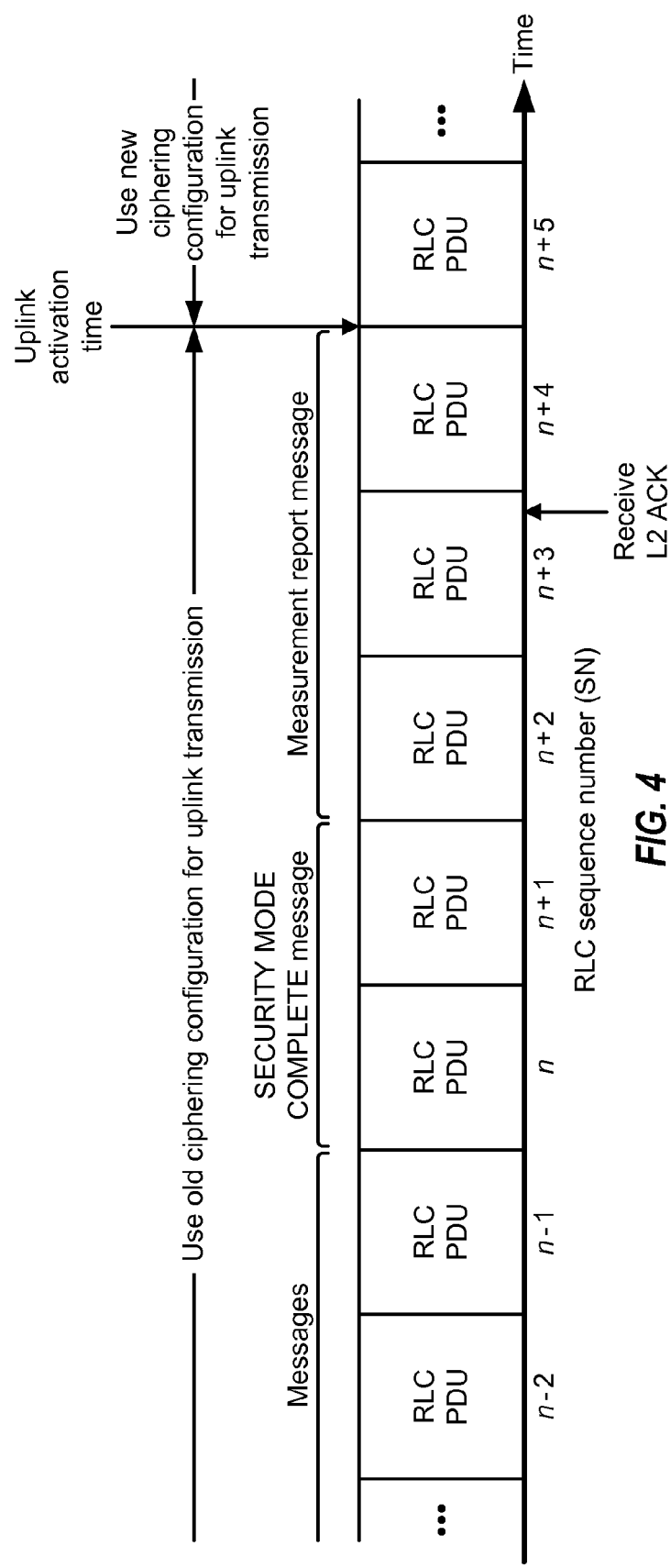
FIG. 4 shows a timeline for the UE for a change in ciphering configuration with a delayed uplink activation time.

FIG. 4 shows an example timeline for UE 110 during a change in ciphering configuration with a delayed uplink activation time to avoid suspension of uplink transmission. The SECURITY MODE COMPLETE message may be sent in a particular number of RLC PDUs. The uplink activation time may be given in terms of the sequence number of the first RLC PDU to send using the new ciphering configuration. In the example shown in FIG. 3, the SECURITY MODE COMPLETE message is sent in two RLC PDUs with sequence numbers of n and n+1. If the uplink activation time is set to the next RLC sequence number of n+2, then UE 110 would not be able to send the next RLC PDU until an L2 ACK is received for the SECURITY MODE COMPLETE message.

However, the uplink activation time may be delayed in order to avoid suspension of uplink transmission. This may be achieved by selecting an RLC sequence number that is out in the future (instead of the RLC sequence number right after the SECURITY MODE COMPLETE message) as the uplink activation time. The amount of time out in the future is the amount of delay in applying the new ciphering configuration, which may be selected based on various factors as discussed below. In the example shown in FIG. 3, a measurement report message may be sent in three RLC PDUs, and the uplink activation time is delayed by three RLC PDUs to allow UE 110 to send one measurement report message. In this case, the uplink activation time is set to RLC sequence number n+5. The measurement report message may be sent using the old ciphering configuration in RLC PDUs n+2, n+3, and n+4 without any delay. Subsequent messages may be sent using the new ciphering configuration in RLC PDU n+5 and beyond, after receiving the L2 ACK from UTRAN 120. In most instances, the SECURITY MODE COMPLETE message sent in RLC PDUs n and n+1 will be correctly decoded by UTRAN 120, which may then send an L2 ACK sometime before the end of RLC PDU n+4. In these instances, UE 110 would receive the L2 ACK before the uplink activation time, as shown in FIG. 4, and can send messages using the new ciphering configuration without any suspension of uplink transmission.

In one design, the uplink activation time may be selected as follows:

$$SN_{activation} = SN_{next} + N_{before} + N_{SMC} + N_{after}, \quad \text{Eq (1)}$$

where
- $SN_{next}$ is the sequence number of the next RLC PDU to send on the uplink,
- $N_{before}$ is the number of RLC PDUs to send prior to sending the SECURITY MODE COMPLETE message,
- $N_{SMC}$ is the number of RLC PDUs to send for the SECURITY MODE COMPLETE message,
- $N_{after}$ is the number of RLC PDUs to send with the old ciphering configuration after sending the SECURITY MODE COMPLETE message, and
- $SN_{activation}$ is an activation sequence number for the uplink activation time.

The uplink activation time/sequence number may be determined whenever a SECURITY MODE COMMAND message is received from UTRAN 120. $SN_{next}$ may be the sequence number of the next RLC PDU to send after receiving the SECURITY MODE COMMAND message. $N_{before}$ may be determined, e.g., based on pending messages sitting in a buffer at UE 110 and ready to be sent to UTRAN 120 when the SECURITY MODE COMMAND message is received. $N_{before}$ may be zero if there are no pending messages in the buffer or if these messages can be delayed and sent later using the new ciphering configuration. $N_{SMC}$ is typically a known value, e.g., $N_{SMC}=2$ if the SECURITY MODE COMPLETE message can be sent in two RLC PDUs.

$N_{after}$ may be determined based on all messages to send to UTRAN 120 using the old ciphering configuration after sending the SECURITY MODE COMPLETE message, as follows:

$$N_{after} = \sum_{m=1}^{M} N_m, \quad \text{Eq (2)}$$

where $N_m$ is the number of RLC PDUs to send for message m, and
- M is the number of messages to send using the old ciphering configuration after sending the SECURITY MODE COMPLETE message Equation (2) accounts for the fact that different messages may be sent in different numbers of RLC PDUs. In the example shown in FIG. 4, setting $N_{after}=3$ allows UE 110 to send one measurement report message in three RLC PDUs. M measurement report messages may also be sent by setting $N_{after}=3M$. A delta or offset may be added to or subtracted from the summation in equation (2) to account for any factor, e.g., processing delays, etc. In general, $N_{after}$ may be selected to be longer than the expected delay to receive the L2 ACK from UTRAN 120 for the SECURITY MODE COMPLETE message. This would then avoid suspension of uplink transmission in the likely scenario in which UTRAN 120 correctly decodes the SECURITY MODE COMPLETE message and timely sends the L2 ACK.

Figure 5:
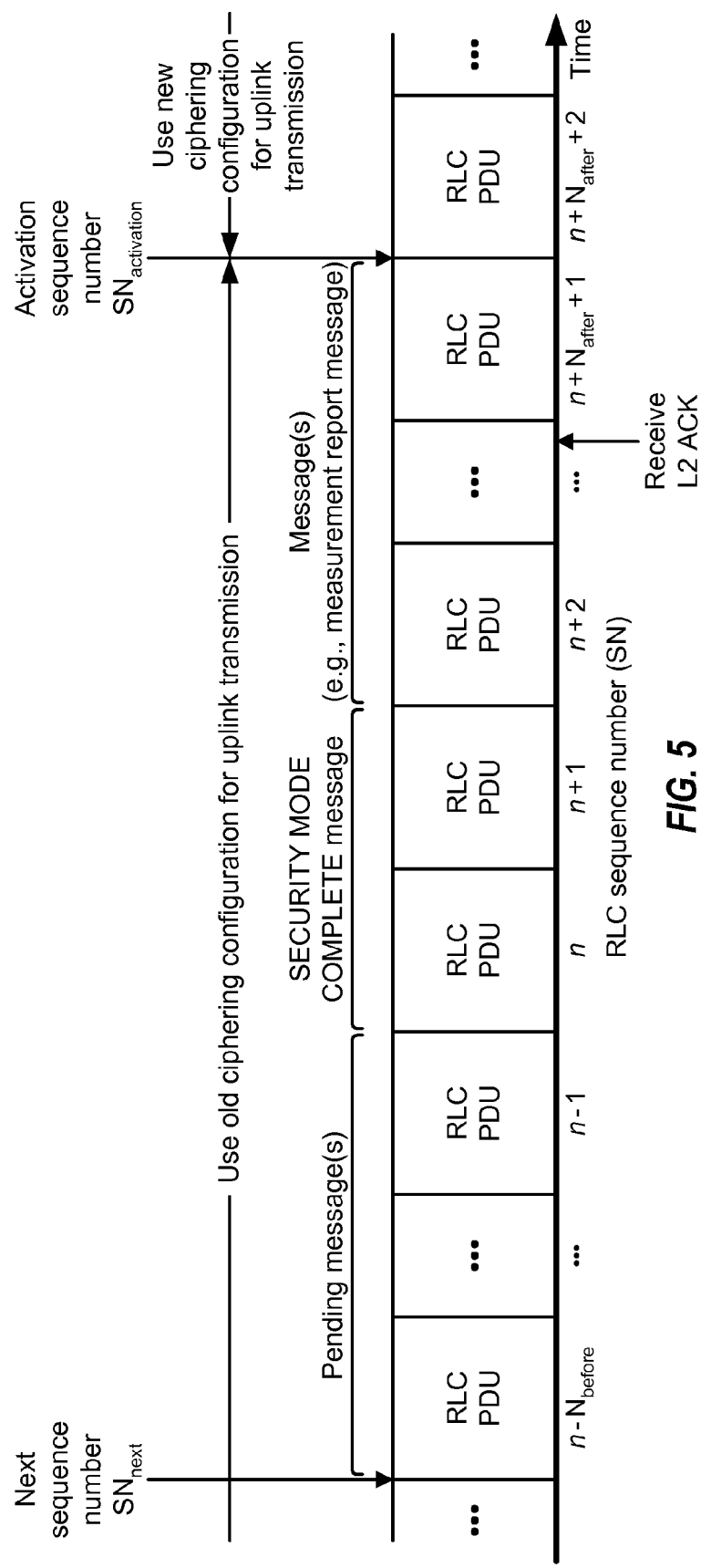
FIG. 5 shows a timeline for determining an activation sequence number.

FIG. 5 shows an example timeline for determining the activation sequence number for a change in ciphering configuration with a delayed uplink activation time. In this example, the sequence number of the next RLC PDU to send on the uplink is $SN_{next}=n-N_{before}$. $N_{before}$ RLC PDUs with sequence numbers of $n-N_{before}$ to $n-1$ may be sent for pending message(s) prior to the SECURITY MODE COMPLETE message. Two RLC PDUs with sequence numbers of n and n+1 may be sent for the SECURITY MODE COMPLETE message. $N_{after}$ RLC PDUs with sequence numbers of n+2 to $n+N_{after}+1$ may be sent for one or more messages using the old ciphering configuration after sending the SECURITY MODE COMPLETE message. In this example, the activation sequence number may be set to $SN_{activation}=n+N_{after}+2$.

Sending messages using the old ciphering configuration after sending the SECURITY MODE COMPLETE message allows UTRAN 120 to correctly decipher these messages regardless of the status of the SECURITY MODE COMPLETE message. In the example shown in FIG. 4, if the SECURITY MODE COMPLETE message is decoded in error, then UTRAN 120 would not send an L2 ACK but can still decipher the measurement report message sent using the old ciphering configuration. UE 110 would resend the SECURITY MODE COMPLETE message, e.g., after receiving an L2 ACK for the measurement report message but not one for the SECURITY MODE COMPLETE message. Upon successfully decoding the second transmission of the SECURITY MODE COMPLETE message, UTRAN 120 can reorder the RLC PDUs and pass up the measurement report message right away. If the measurement report message was not sent using the old ciphering configuration, then UE 110 may send this message after receiving an L2 ACK from UTRAN 120 for the second transmission of the SECURITY MODE COMPLETE message, which would further delay reception of the measurement report message by UTRAN 120.

A ciphering configuration is considered to be pending after a security mode control procedure is started and until the activation time is reached. UTRAN 120 may initiate another security mode control procedure while a pending ciphering configuration exists. For a given security mode control procedure, UTRAN 120 may (i) select a suitable downlink activation time if no pending ciphering configuration exists or (b) use the downlink activation time for a pending ciphering configuration if one exits. UTRAN 120 may send one or more SECURITY MODE COMMAND messages while a pending ciphering configuration exists, but each such message would carry the same downlink activation time. This constraint avoids the need to maintain multiple activation times for overlapping security mode control procedures.

The same operation may also be applied for the uplink. UE 110 may (i) select a suitable uplink activation time if no pending ciphering configuration exists or (b) use the uplink activation time for a pending ciphering configuration if one exits. UE 110 may send one or more SECURITY MODE COMPLETE messages while a pending ciphering configuration exists, but each such message would carry the same uplink activation time.

UE 110 may maintain a pending flag that may be set to true (or '1') if a pending ciphering configuration exists or to false (or '0') if no pending ciphering configuration exists. UE 110 may use this pending flag to select the uplink activation time, e.g., whenever a SECURITY MODE COMMAND message is received from UTRAN 120. UE 110 may also store the pending uplink activation time, which is denoted as $SN_{pending}$.

In one design, UE 110 may set the uplink activation time as follows:

```
10   If (Pending_Flag = false)
20       Then SN_activation = SN_next + N_before + N_SMC + N_after
30   If (Pending_Flag = true) and
40       If {(SN_pending − SN_next) ≥ (N_before + N_SMC)}
50           Then SN_activation = SN_pending
60       Else SN_activation = SN_next + N_before + N_SMC + N_after
```

In the above pseudo-code, the uplink activation time may be set as shown in equation (1) when no pending ciphering configuration exists (lines 10 and 20). If a pending ciphering configuration exists, then the pending uplink activation time is used if it is sufficiently far out to allow for transmission of $N_{before}$ RLC PDUs before the SECURITY MODE COMPLETE message as well as $N_{SMC}$ RLC PDUs for this message (lines 30, 40 and 50). Otherwise, if $N_{before}+N_{SMC}$ RLC PDUs cannot be sent prior to the pending uplink activation time, then the uplink activation time may be set as shown in equation (1) (line 60). However, RLC PDUs are not sent using the new ciphering configuration until an L2 ACK is received for the SECURITY MODE COMPLETE message.

UE 110 may send transmission on the uplink as follows:
1. Send RLC PDUs with sequence numbers less than $SN_{activation}$ using the old ciphering configuration,
2. Send RLC PDUs with sequence numbers greater than or equal to $SN_{activation}$ using the new ciphering configuration, and
3. Suspend sending RLC PDUs with sequence numbers greater than or equal to $SN_{activation}$ until an L2 ACK is received for the SECURITY MODE COMMAND message.

FIG. 6 shows a process 600 performed by a transmitter entity, which may be UE 110 for uplink transmission or UTRAN 120 for downlink transmission. First information is sent using a first ciphering configuration (block 612). An activation time for a second ciphering configuration is selected, e.g., during a security mode control procedure (block 614). A security message with the activation time is sent to a receiver entity (block 616). This security message may be a SECURITY MODE COMPLETE message sent by UE 110 on the uplink, a SECURITY MODE COMMAND message sent by UTRAN 120 on the downlink, or some other message. Second information is sent using the first ciphering configuration after sending the security message and before the activation time (block 618). The second information may comprise a measurement report message, an active set update message, etc. An acknowledgement may be received for the security message before the activation time (block 620). Third information is sent using the second ciphering configuration after the activation time (block 622). The first, second and third information may comprise signaling, messages, data, etc., or any combination thereof.

For block 614, the activation time may be selected to be some amount of time after the end of the security message. The activation time may be selected based on (a) any pending messages to send using the first ciphering configuration before sending the security message, (b) the length of the security message, and (c) at least one message to send using the first ciphering configuration after sending the security message. If a pending ciphering configuration exists, then the activation time may be set to a pending activation time, e.g., if this pending activation time allows for sending pending messages and the security message using the first ciphering configuration. The activation time may also be set in the normal manner even when a pending ciphering configuration exists.

The first, second, and third information and the security message may be sent in PDUs with sequential sequence numbers, and an activation sequence number may be used as the activation time. The activation sequence number may be the sequence number of a PDU that is a particular number of PDUs after the last PDU for the security message. For example, the activation sequence number may be determined based on the sequence number of the next PDU to send, the number of PDUs to send before the security message, the number of PDUs to send for the security message, and the number of PDUs to send using the first ciphering configuration after sending the security message, as shown in equation (1). Transmission of PDUs with sequence numbers greater than or equal to the activation sequence number may be suspended until an acknowledgement is received for the security message.

FIG. 7 shows a process 700 performed by a receiver entity, which may be UE 110 for downlink transmission or UTRAN 120 for uplink transmission. First information is received and deciphered based on a first ciphering configuration (block 712). A security message with an activation time for a second ciphering configuration is received, e.g., during a security mode control procedure (block 714). The security message may be a SECURITY MODE COMMAND message received by UE 110 on the downlink, a SECURITY MODE COMPLETE message received by UTRAN 120 on the uplink, or some other message. An acknowledgement for the security message may be sent before the activation time (block 716). Second information is received after the security message and before the activation time (block 718). The second information, which may comprise a measurement report message, an active set update message, etc., is deciphered based on the first ciphering configuration (block 720).

Third information is received after the activation time (block 722) and deciphered based on the second ciphering configuration (block 724).

The techniques described herein may avoid suspension of transmission while ensuring that a receiver entity can decipher information sent using the old and new ciphering configurations. The techniques may improve performance, e.g., reduce the likelihood of a dropped call during a change in ciphering configuration in high mobility and/or bad radio conditions. The techniques may provide one or more of the following advantages:

- Allow the UE to send measurement report messages and other time-sensitive messages when ciphering configuration is pending,
- Allow the UTRAN to send active set update messages and other messages when ciphering configuration is pending,
- Avoid a scenario in which the UE and UTRAN need to maintain multiple pending security configurations, and
- Conform to W-CDMA security procedures described in 3GPP TS 25.331.

Figure 8:
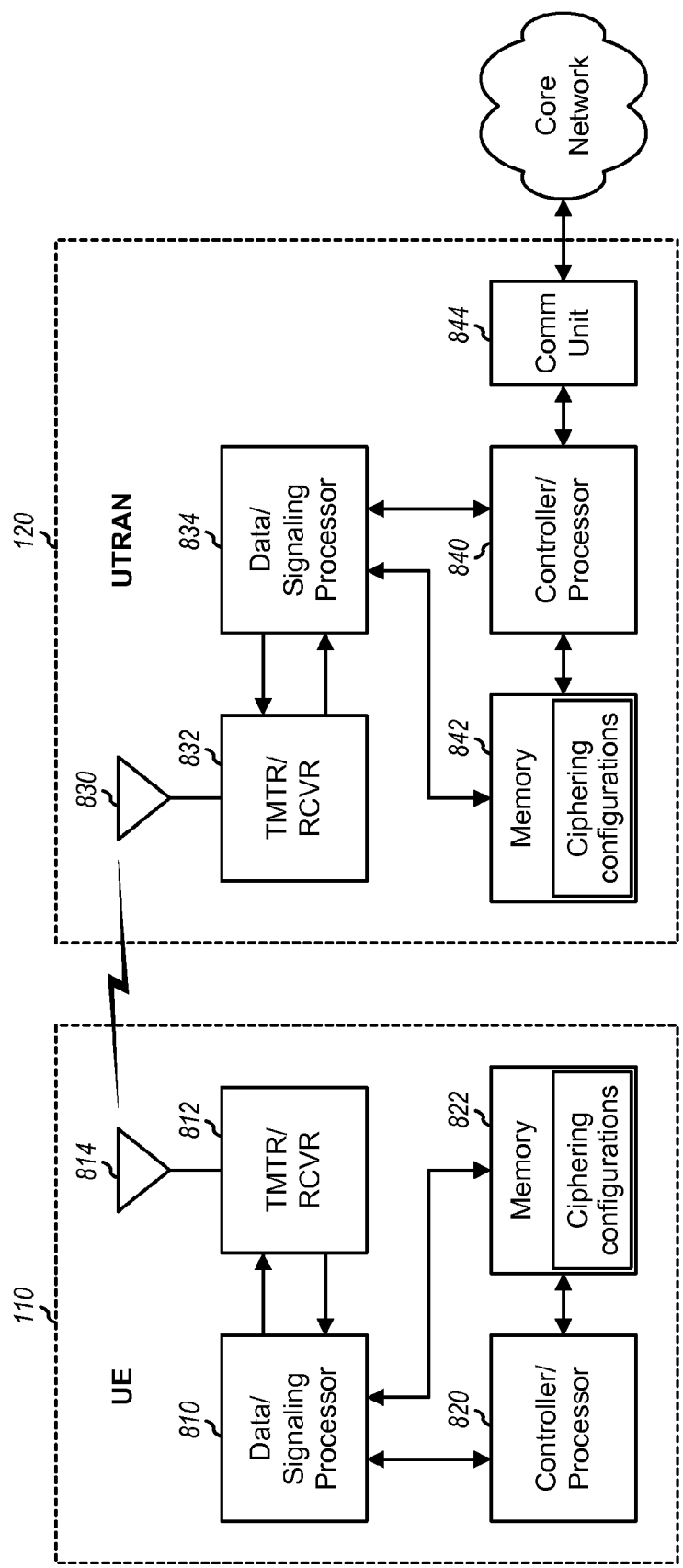
FIG. 8 shows a block diagram of the UE and UTRAN.

FIG. 8 shows a block diagram of UE 110 and UTRAN 120. On the uplink, at UE 110, a data/signaling processor 810 processes (e.g., formats, encodes, and modulates) information to be sent to UTRAN 120 in accordance with a radio technology (e.g., W-CDMA) and generates output chips. A transmitter (TMTR) 812 then conditions (e.g., converts to analog, filters, amplifies, and frequency upconverts) the output chips and generates an uplink signal, which is transmitted via an antenna 814. At UTRAN 120, the reverse link signals from UE 110 and other UEs are received via an antenna 830 and conditioned (e.g., filtered, amplified, frequency downconverted, and digitized) by a receiver (RCVR) 832 to obtain samples. A data/signaling processor 834 then processes (e.g., demodulates and decodes) the samples to obtain the information sent by UE 110 and other UEs.

On the downlink, at UTRAN 120, information to be sent to the UEs are processed by data/signaling processor 834 and further conditioned by a transmitter 832 to generate a downlink signal, which is transmitted via antenna 832. At UE 110, the downlink signal from UTRAN 120 is received via antenna 814, conditioned by a receiver 812, and processed by data/signaling processor 810 to obtain the information sent by UTRAN 120 to UE 110.

Controllers/processors 820 and 840 control the operation at UE 110 and UTRAN 120, respectively. Processors 810, 820, 834 and/or 840 may implement process 600 in FIG. 6 for transmission, process 700 in FIG. 7 for reception, and/or other processes to support communication with ciphering. Memories 822 and 842 store program codes and data for UE 110 and UTRAN 120, respectively. Memory 822 may store ciphering configurations for UE 110. Memory 842 may store ciphering configurations for UE 110 and other UEs being served by UTRAN 120. UTRAN 120 may communicate with other network entities via a communication (Comm) unit 844.

FIG. 8 shows a simplified block diagram of UE 110 and UTRAN 120. In general, UE 110 and UTRAN 120 may each include any number of processors, memories, communication units, etc.

The techniques described herein may be implemented by various means. For example, these techniques may be implemented in hardware, firmware, software, or a combination thereof. For a hardware implementation, the processing units used to perform the techniques at a given entity (e.g., a UE or a UTRAN) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

For a firmware and/or software implementation, the techniques may be implemented with modules (e.g., procedures, functions, and so on) that perform the functions described herein. The firmware and/or software codes may be stored in a memory (e.g., memory 822 or 842 in FIG. 8) and executed by a processor (e.g., processor 820 or 840). The memory may be implemented within the processor or external to the processor.

An apparatus implementing the techniques described herein may be a stand-alone unit or may be part of a device. The device may be (i) a stand-alone integrated circuit (IC), (ii) a set of one or more ICs that may include memory ICs for storing data and/or instructions, (iii) an ASIC such as a mobile station modem (MSM), (iv) a module that may be embedded within other devices, (v) a cellular phone, wireless device, handset, or mobile unit, (vi) etc.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
    at least one processor configured to
        send first information using a first ciphering configuration,
        select an activation time for a second ciphering configuration,
        send a first security message with the activation time,
        delay a suspension of transmissions occurring after receiving an acknowledgement for the first security message and before the activation time,
        send second information using the first ciphering configuration after sending the first security message and before the activation time, and
        send third information using the second ciphering configuration after the activation time; and
    a memory coupled to the at least one processor and configured to store the first and second ciphering configurations.

2. The apparatus of claim 1, wherein the at least one processor is configured to select the activation time to be a particular amount of time after an end of sending the first security message.

3. The apparatus of claim 1, wherein the at least one processor is configured to select the activation time based on pending messages to send using the first ciphering configuration before sending the first security message.

4. The apparatus of claim 1, wherein the at least one processor is configured to select the activation time based on at least one message to send for the second information using the first ciphering configuration.

5. The apparatus of claim 4, wherein the at least one message comprises a measurement report message.

6. The apparatus of claim 4, wherein the at least one message comprises an active set update message.

7. The apparatus of claim 1, wherein the at least one processor is configured to send the first, second, and third information and the first security message in protocol data units (PDUs) with sequential sequence numbers, to select a sequence number of a PDU that is a particular number of PDUs after a last PDU for the first security message as an activation sequence number, and to use the activation sequence number as the activation time.

8. The apparatus of claim 7, wherein the at least one processor is configured to determine the activation sequence number based on:
 a sequence number of a next PDU to send,
 a number of PDUs to send before the first security message,
 a number of PDUs to send for the first security message, and
 a number of PDUs to send using the first ciphering configuration after sending the first security message.

9. The apparatus of claim 7, wherein the at least one processor is configured to suspend transmission of PDUs with sequence numbers greater than or equal to the activation sequence number until an acknowledgement is received for the first security message.

10. The apparatus of claim 1, wherein the at least one processor is configured to receive an acknowledgement for the first security message before the activation time.

11. The apparatus of claim 1, wherein the at least one processor is configured to set the activation time to a pending activation time if a pending ciphering configuration exists.

12. The apparatus of claim 1, wherein the at least one processor is configured to set the activation time to a pending activation time if a pending ciphering configuration exists and the pending activation time allows for sending pending messages and a second security message using the first ciphering configuration.

13. The apparatus of claim 1, wherein the first security message is a SECURITY MODE COMPLETE message sent on uplink.

14. The apparatus of claim 1, wherein the first security message is a SECURITY MODE COMMAND message sent on downlink.

15. A method comprising:
 a transmitter entity sending first information using a first ciphering configuration;
 the transmitter entity selecting an activation time for a second ciphering configuration;
 the transmitter entity sending a first security message with the activation time;
 the transmitter entity delaying a suspension of transmissions occurring after receiving an acknowledgement for the first security message and before the activation time;
 the transmitter entity sending second information using the first ciphering configuration after sending the first security message and before the activation time; and
 the transmitter entity sending third information using the second ciphering configuration after the activation time.

16. The method of claim 15, wherein the transmitter entity selecting the activation time comprises
 the transmitter entity selecting the activation time based on at least one message to send for the second information using the first ciphering configuration.

17. The method of claim 15, wherein the first, second, and third information and the first security message are sent in protocol data units (PDUs) with sequential sequence numbers, and wherein the transmitter entity selecting the activation time comprises
 the transmitter entity determining an activation sequence number based on:
  a sequence number of a next PDU to send,
  a number of PDUs to send before the first security message,
  a number of PDUs to send for the first security message, and
  a number of PDUs to send using the first ciphering configuration after sending the first security message, and
 the transmitter entity using the activation sequence number as the activation time.

18. The method of claim 17, further comprising:
 the transmitter entity suspending sending PDUs with sequence numbers greater than or equal to the activation sequence number until an acknowledgement is received for the first security message.

19. An apparatus comprising:
 means for sending first information using a first ciphering configuration;
 means for selecting an activation time for a second ciphering configuration;
 means for sending a first security message with the activation time;
 means for delaying a suspension of transmissions occurring after receiving an acknowledgement for the first security message and before the activation time;
 means for sending second information using the first ciphering configuration after sending the first security message and before the activation time; and
 means for sending third information using the second ciphering configuration after the activation time.

20. The apparatus of claim 19, wherein the first, second, and third information and the first security message are sent in protocol data units (PDUs) with sequential sequence numbers, and wherein the means for selecting the activation time comprises
 means for determining an activation sequence number based on:
  a sequence number of a next PDU to send,
  a number of PDUs to send before the first security message,
  a number of PDUs to send for the first security message, and
  a number of PDUs to send using the first ciphering configuration after sending the first security message, and
 means for using the activation sequence number as the activation time.

21. A non-transitory processor readable medium for storing instructions configured to:
 send first information using a first ciphering configuration;
 select an activation time for a second ciphering configuration;
 send a first security message with the activation time;
 delay a suspension of transmissions occurring after receiving an acknowledgement for the first security message and before the activation time;
 send second information using the first ciphering configuration after sending the first security message and before the activation time; and
 send third information using the second ciphering configuration after the activation time.

22. The non-transitory processor readable medium of claim 21, and further for storing instructions configured to:
 send the first, second, and third information and the first security message in protocol data units (PDUs) with sequential sequence numbers;
 determine an activation sequence number based on:
  a sequence number of a next PDU to send, a number of PDUs to send before the first security message, a number of PDUs to send for the first security message, and a number of PDUs to send using the first ciphering configuration after sending the first security message; and use the activation sequence number as the activation time.

* * * * *